United States Patent [19]

Diperstein

[11] Patent Number: 4,599,781
[45] Date of Patent: Jul. 15, 1986

[54] METHOD OF REPAIRING CRACKED THIN METAL PARTS

[76] Inventor: David Diperstein, 125 Bickley Rd., Glenside, Pa. 19038

[21] Appl. No.: 682,461

[22] Filed: Dec. 17, 1984

[51] Int. Cl.⁴ ............................................. B23P 6/04
[52] U.S. Cl. .............................. 29/402.11; 29/402.15; 29/402.17; 29/530; 164/92.1
[58] Field of Search ....... 29/530, 401.1, 402.1–402.21, 29/527.4; 164/92.1

[56] References Cited

U.S. PATENT DOCUMENTS

| 2,011,484 | 8/1935 | Harman | 29/402.17 X |
| 2,649,650 | 8/1953 | Javor | 29/402.11 |
| 2,838,145 | 6/1958 | Schulte | 29/402.11 X |
| 2,998,645 | 9/1961 | Diperstein | 29/402.11 |

Primary Examiner—Howard N. Goldberg
Assistant Examiner—Ronald S. Wallace
Attorney, Agent, or Firm—Seidel, Gonda, Goldhammer & Abbott

[57] ABSTRACT

Thin metal parts such as one eighth inch or less cast iron or one quarter inch or less cast aluminum are repaired by drilling a series of overlapping holes extending generally perpendicular to the crack at each end of the crack and at spaced locations along the crack. A lock of the general outline of the series of overlapping holes is fixedly secured in each of the series of overlapping holes. At least one hole having a diameter no greater than 0.200 inches is drilled in the crack between the locks so that the hole overlaps a portion of one of the locks. The hole is tapped with a tap having at least 27 threads per inch and a plug having the same number of threads per inch as the tapped hole is secured in the tapped hole thereby pre-stressing the locks and filling the gap of the crack. The plug is torqued until the torquing force exceeds the strength of the plug thereby snapping off a portion of the plug which extends beyond the surface of the part. Additional holes are drilled, tapped and plugged along the crack to completely fill the gap of the crack. Preferably, the tapped holes and plugs are tapered, the tapered plug having a maximum diameter of about 0.205 inches and a minimum diameter of about 0.155 inches, and the tapped hole and plug having 32 threads per inch.

12 Claims, 7 Drawing Figures

U.S. Patent  Jul. 15, 1986  4,599,781
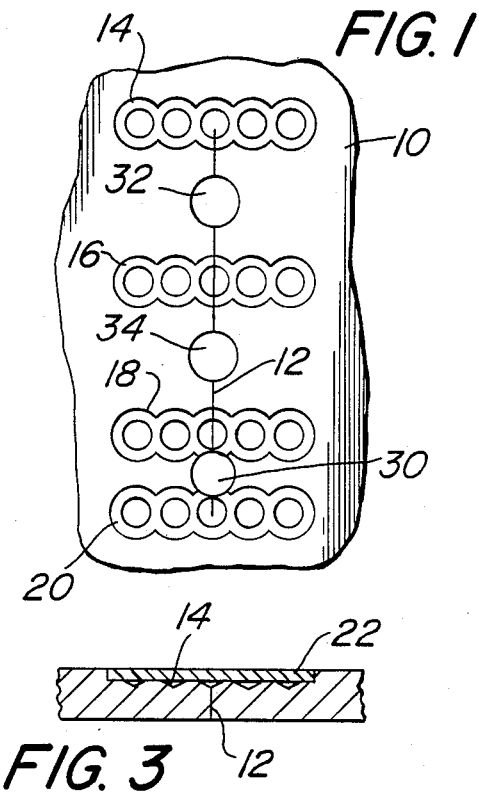
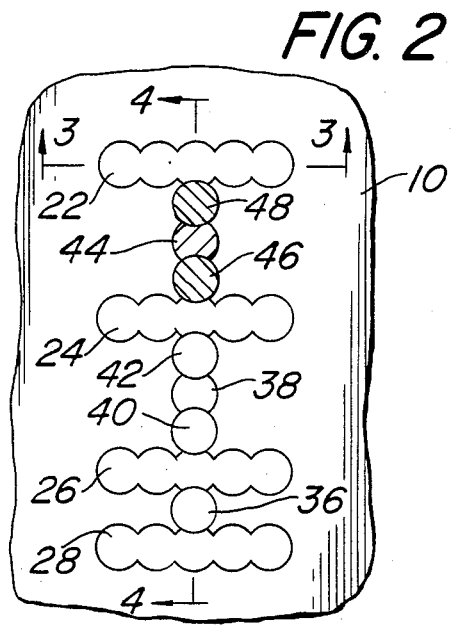
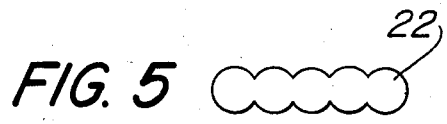
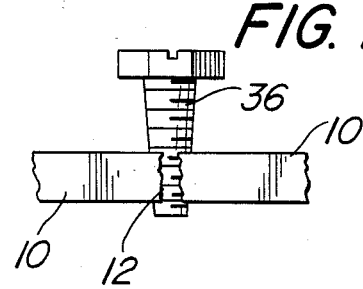

METHOD OF REPAIRING CRACKED THIN METAL PARTS

BACKGROUND

This invention relates to a method of repairing cracked or fractured thin metal parts, and more particularly to a method of repairing cracked or fractured thin metal parts such as one eighth inch cast iron and one quarter inch cast aluminum.

Past practice of repairing thicker metal parts is to use fasteners commonly known as "chain-locks", "meta-locks", and "seal-locks" without the application of heat. Such a method is described in my prior U.S. Pat. No. 2,998,645.

This method enabled the repair of cracks in metal walls of automobile cylinder blocks, large pipes, valves, transmission housings, etc. without the use of external heat. In making automobiles and trucks lighter, manufacturers have been decreasing the weight by making engine blocks of much thinner cast iron or from cast aluminum. These thinner cast iron and aluminum parts have led to problems when the old method of crack repair has been attempted.

Since most repair plugs are made of cast iron or steel, the repair plugs are stronger than the thinner cast iron or cast aluminum being repaired. Therefore, turning of the repair plugs into the tapped and threaded holes in the thinner cast iron or cast aluminum causes the plugs to continue tapping the hole so that the plug is never really snug to make a proper seal against water pressure, air pressure, or compression.

While my solution to the above-identified problem seems simple once disclosed, no other individual skilled in the art of crack repair has discovered the solution prior to me.

SUMMARY OF THE INVENTION

It is an object of the present invention to overcome the disadvantages of the prior methods for repairing cracked or fractured metal parts when such methods are applied to thinner metal parts such as one eighth inch cast iron or one quarter inch cast aluminum.

It is another object of the present invention to provide a method of repairing cracked or fractured thin metal parts without the use of heat by pre-stressing locks after the locks have been applied across the crack.

It is another object of the invention to provide a method of repairing cracked or fractured thin metal parts using tapered plugs or bolts.

A further object of the present invention is to provide a method of repairing cracked or fractured thin metal parts which is simple, efficient, and capable of being performed by unskilled labor.

Other objects will appear hereinafter.

The foregoing objects are met by using plugs of bolts having a smaller diameter and more threads per inch than the prior art plugs or bolts. Due to the increased number of threads per inch, the frictional force between the plug and part being repaired is greater than when the prior art plugs are used. Further, the smaller diameter plugs in combination with the increased number of threads per inch results in the head of the plug being snapped off and the crack being sealed against water pressure, for example, rather than the plug continuing to tap the hole as occurs when the prior art plugs are used to repair thinner metal parts.

For the purpose of illustrating the invention, there is shown in the drawings a form which is presently preferred; it being understood, however, that this invention is not limited to the precise arrangements and instrumentalities shown.

FIG. 1 is a plan view of a cracked thin metal part during an intermediate stage of repair according to the present invention.

FIG. 2 is a plan view of the thin metal crack of FIG. 1 in which the locks have been secured and the gap of the crack is being filled by plugs of the present invention.

FIG. 3 is a cross-sectional view taken along line 3—3 in FIG. 2.

FIG. 4 is a cross-sectional view taken along line 4—4 in FIG. 2.

FIG. 5 is a plan view of a lock used in the method of the present invention.

FIG. 6 is a side view of the lock shown in FIG. 5.

FIG. 7 is a side view of a cracked thin metal part with a tapered threaded bolt extending through the wall at the crack.

DETAILED DESCRIPTION

Referring to the drawings in detail, wherein like numerals indicate like elements, there is shown in FIG. 1 a plan view of a cracked thin metal part 10 which is being repaired according to the present invention. As shown in FIGS. 1 through 3 and 7 the metal part 10 has a crack 12 therein. A series of overlapping blind holes extending generally perpendicular away from the crack is provided as shown at 14. The series of overlapping blind holes 14 are positioned at or adjacent to one end of the crack 12. At spaced locations along the length of the crack 12, a series of overlapping blind holes 16 and 18 are provided. At the opposite end of the crack 12 from the holes 14 is a series of overlapping blind holes 20.

As shown more clearly in FIGS. 5 and 6, a lock 22 having a contour substantially identical with the contour of the series of overlapping blind holes 14, 16 18 and 20 is provided. The lock 22 is preferably arcuate in elevation as shown in FIG. 6. As shown in FIG. 2, lock 22 is fixedly secured in the holes 14. Identical locks 24, 26 and 28 are fixedly secured in holes 16, 18 and 20. The locks are flattened by any convenient instrument such as an air hammer. Preferably, the flattening of the locks will make the uppermost surface of the locks flush with the uppermost surface of the metal part.

Next holes 30, 32 and 34 are bored in the crack between the locks. If the locks are sufficiently close together, the hole will overlap a portion of each of the adjacent locks such as hole 30 and locks 26 and 28. If the spacing between the locks is greater than the diameter of the hole, the hole which is drilled in the crack between the locks is located so that a plurality of holes will overlap each other and the adjacent locks to completely fill the gap of the crack when the holes are plugged.

The holes 30, 32 and 34 are then tapped so as to provide a thread therein. The holes 30, 32 and 34 may be tapered. Preferably the tap is tapered so that the tapered tap cuts both the thread and a taper in the hole. The tap used in the present invention has more than 27 threads per inch. The tape used in the prior art methods have threads of 27 threads per inch or coarser which results in the plug or bolt continuing to tap the hole in thinner metal parts such as one eighth inch cast iron or one quarter inch cast aluminum.

The preferred dimensions for the bolt are a maximum diameter of 0.205 inches and a minimum diameter of 0.155, the bolt being 1 inch in length. Since the holes are drilled and tapped to match the preferred bolt, holes 30, 32 and 34 have a maximum diameter of 0.200 inches and, if tapered, have a taper of about 0.05 inches per inch.

As the tapered bolt 36 is threaded into the hole 30, the locks 26 and 28 will be pre-stressed thereby preventing the locks 26 and 28 from being separated from the metal part 10 due to the vibration of the metal part 10. The tapered bolt 36 will be turned by a torque wrench until it snaps in shear. By using 1008 steel bolts of the preferred dimensions, the bolts will shear at or near the upper surface of the thin metal part 10 upon application of about 1 to 3 foot pounds of torque. Any portion of the bolt 36 above the surface of the metal part 10 may be removed by any convenient manner such as grinding. The resultant structure will be as shown at the left hand end of FIG. 4 wherein the uppermost surface of the tapered bolt 36 and the locks 26 and 28 are flush with the uppermost surface of the metal part 10.

If the crack to be repaired has an appreciable length, locks 24 and 26 would be fixedly secured within a series of overlapping blind holes 16 and 18 between the overlapping blind holes 14 and 20. Hole 34 between locks 24 and 26 is tapped with a tapered tap and is then filled with a tapered threaded bolt 38. The uppermost portion of the bolt 38 is then removed so as to be flush with the uppermost surface of the metal part 10.

A hole is then provided through the crack between the lock 26 and bolt 38. The hole is then tapered with a tapered tap and filled with a tapered threaded bolt 40. As more clearly shown in FIGS. 1 and 4, the bolt 40 is interlocked with lock 24 and bolt 38. Then the uppermost portion of the bolt 40 is made flush with the uppermost surface of the metal part 10.

Tapered bolts 44, 46 and 48 are provided over the length of the crack intermediate blocks 22 and 24 in the same manner as set forth above. For the purposes of illustration, the uppermost portion of the bolts 44, 46 and 48 have not been removed in FIG. 4.

While the tapered plug 38 has been disclosed as the first bolt to be inserted between locks 24 and 26, it will be clear that tapered bolt 40 may be the first bolt to be threaded into the metal part 10. Thereafter, tapered bolt 38 would be provided and interlocked with the tapered bolt 40. Thereafter, tapered bolt 42 would be provided and interlocked with tapered bolt 38 and lock 24.

As discussed above, the preferred dimensions and materials of the bolts or plugs is critical to the repairing of thin metal parts such as one eighth inch cast iron or one quarter inch cast aluminum parts. The larger bolts of the prior art do not seal the crack but continue to tap the hole bored in the crack. The increased threaded area due to the increased threads per inch provide an increased sealing area against leakage and in combination with the reduced diameter of the plug enable the plug to shear off at or near the surface of the metal part 10 without the necessity of providing a groove in the plug as required by the prior art. Therefore, another advantage of the present invention is that standard commercial bolts may be used as plugs.

While the method of repair described includes the use of locks 22, 24, 26 and 28, the tapered plugs of the present invention may be used without the locks, particularly if the metal to be repaired is thin or soft.

The present invention may be embodied in other specific forms without departing from the spirit or essential attributes thereof and, accordingly, reference should be made to the appended claims, rather than to the foregoing specification, as indicating the scope of the invention.

I claim:

1. A method of repairing a cracked or fractured thin metal part comprising the steps of providing a hole of diameter no greater than 0.200" in a crack or fracture in the part, tapping the hole with a tap having more than 27 threads per inch, securing a plug having the same number of threads per inch as the tapped hole in the tapped hole thereby filling the gap of the crack or fracture, and torquing the plug until the torquing force exceeds the strength of the plug whereby a portion of the plug extending beyond the surface of the part snaps off.

2. The method in accordance with claim 1 wherein ⅛ inch or less cast iron or ¼ inch or less cast aluminum is repaired by providing the hole in a crack in the ⅛ inch or less cast iron or ¼ inch or less cast aluminum.

3. The method in accordance with claim 1 including snapping off the portion of the plug extending beyond the surface of the part near the surface of the part without providing a groove in the plug to weaken the plug whereby the plug will snap off at the groove.

4. The method in accordance with claim 1 wherein the hole is bored using a tapered drill whereby the hole is a tapered hole.

5. The method in accordance with claim 4 wherein the tapered hole is plugged with a tapered plug having a minimum diameter of about 0.155 inches and a maximum diameter of about 0.200 inches.

6. The method in accordance with claim 1 wherein the hole is tapped with a tap having 32 threads per inch.

7. The method in accordance with claim 1 wherein the hole is bored with a straight untapered drill and the hole is tapped with a tapered tap having a minimum diameter of about 0.155 inches and a maximum diameter of about 0.200 inches.

8. The method in accordance with claim 1 wherein the maximum torquing force is about 3 foot pounds.

9. A method of repairing a cracked or fractured thin metal part comprising the steps of providing a series of overlapping holes extending generally perpendicular to a crack or fracture in the part, providing a second series of overlapping holes extending generally perpendicular to the crack or fracture at a spaced location along the crack, fixedly securing a lock in each of the series of overlapping holes, providing a hole of diameter no greater than 0.200 inches in the crack or fracture between the locks so that the hole overlaps a portion of one of the locks, tapping the last-mentioned hole with a tap having more than 27 threads per inch, securing a plug having the same number of threads per inch as the tapped hole in the tapped hole thereby pre-stressing the locks and filling the gap of the crack or fracture, and torquing the plug until the torquing force exceeds the strength of the plug whereby a portion of the plug extending beyond the surface of the parts snaps off near the surface of the part without the plug being provided with a groove to weaken the plug to enable the plug to snap off at the groove.

10. The method in accordance with claim 9 wherein the series of overlapping holes are bored only partially through the metal part to form a series of blind holes.

11. The method in accordance with claim 9 wherein ⅛ inch or less cast iron or ¼ inch or less cast aluminum is repaired by providing the last mentioned hole in a crack in the ⅛ inch or less cast iron or ¼ inch or less cast aluminum.

12. The method in accordance with claim 9 wherein the maximum torquing force is about 3 foot pounds.

* * * * *